(12) United States Patent
Zhang

(10) Patent No.: US 9,016,920 B2
(45) Date of Patent: Apr. 28, 2015

(54) BACKLIGHT MODULE AND LCD DEVICE

(71) Applicant: Shenzhen China Star Optoelectronics Technology Co., Ltd, Shenzhen (CN)

(72) Inventor: Yanxue Zhang, Shenzhen (CN)

( * ) Notice: Subject to any disclaimer, the term of this patent is extended or adjusted under 35 U.S.C. 154(b) by 217 days.

(21) Appl. No.: 13/701,036

(22) PCT Filed: Oct. 23, 2012

(86) PCT No.: PCT/CN2012/083378
§ 371 (c)(1),
(2) Date: Nov. 30, 2012

(87) PCT Pub. No.: WO2014/047994
PCT Pub. Date: Apr. 3, 2014

(65) Prior Publication Data
US 2014/0085928 A1    Mar. 27, 2014

(51) Int. Cl.
*F21V 29/00* (2006.01)
*F21V 23/00* (2006.01)
*H01J 61/52* (2006.01)
*G02F 1/13357* (2006.01)
*G02F 1/1335* (2006.01)

(52) U.S. Cl.
CPC ............ *F21V 29/008* (2013.01); *H01J 61/523* (2013.01); *G02F 1/133615* (2013.01)

(58) Field of Classification Search
CPC ....... F21V 29/008; H01J 61/52; H01J 61/523; H01J 61/526; G02F 1/133615
USPC ............ 362/580, 611, 630, 631, 634; 313/15; 315/115, 116
See application file for complete search history.

(56) References Cited

U.S. PATENT DOCUMENTS

| | | | |
|---|---|---|---|
| 5,274,305 A * | 12/1993 | Bouchard | 315/108 |
| 5,909,085 A * | 6/1999 | Nelson | 315/94 |
| 6,254,244 B1 * | 7/2001 | Ukai et al. | 362/611 |
| 6,697,130 B2 * | 2/2004 | Weindorf et al. | 349/65 |
| 7,070,291 B2 * | 7/2006 | Sotokawa et al. | 362/632 |
| 8,072,148 B2 * | 12/2011 | Iwai | 315/98 |
| 8,434,909 B2 * | 5/2013 | Nichol et al. | 362/296.01 |

FOREIGN PATENT DOCUMENTS

| | | |
|---|---|---|
| CN | 101042481 A | 9/2007 |
| CN | 201688371 U | 12/2010 |
| CN | 102147085 A | 8/2011 |
| CN | 202101038 U | 1/2012 |
| JP | 11283427 A | 10/1999 |
| JP | 2010277924 A | 12/2010 |

OTHER PUBLICATIONS

Zhong Yu, the International Searching Authority written comments, Jul. 2013, CN, PCT/CN2012/083378.

* cited by examiner

*Primary Examiner* — Alan Cariaso

(57) ABSTRACT

The present disclosure provides a backlight module and a liquid crystal display (LCD) device. The backlight module includes a light guide panel (LGP), a lightbar, and a backplane. The LGP is arranged in the backplane, and the lightbar is arranged on a side of the LGP. The backlight module further includes heating devices that heat two opposite ends of the lightbar. When the lightbar operates, the heating devices emit heat to increase operating temperature of the two opposite ends of the lightbar to make the operating temperature of the two opposite ends of the lightbar to be close to or equal to operating temperature of middle of the lightbar.

9 Claims, 3 Drawing Sheets

BACKLIGHT MODULE AND LCD DEVICE

TECHNICAL FIELD

The present disclosure relates to the field of liquid crystal displays (LCDs), and more particularly to a backlight module, and an LCD device.

BACKGROUND

A liquid crystal display (LCD) device in the prior art includes an LCD panel and a backlight module. Because the LCD panel does not emit light, the backlight module provides a surface light source that emits light uniformly. As shown in FIG. 1, the backlight module includes a light guide panel (LGP) 2, a backplane 1, and a lightbar 3. The lightbar 3 belongs to a line light source. The LGP 2 transforms the line light source to the surface light source used by the LCD panel. As shown in FIG. 2, the lightbar is arranged on a left side of the backlight Because the lightbar is in a shape of a strip, heat for a middle of the lightbar is slowly dissipated and heat for each of two opposite ends of the lightbar is quickly dissipated. Thus, operating temperature of the middle of the lightbar is higher, and operating temperature of each of two opposite ends of the lightbar is lower. Because aging speed and aging degree of the lightbar are directly associated with operating temperature, higher operating temperatures causes aging speed of the lightbar to increase, and causes more serious brightness decay. Because the operating temperature is different, the aging speed and aging degree of each of two opposite ends of the lightbar are different with the aging speed and aging degree of the middle of the lightbar. Thus, brightness is different between two opposite ends of the lightbar and the middle of the lightbar, and light brightness of the entire lightbar is not uniform, finally resulting in that the brightness of two opposite ends of the LGP are bright, and the brightness of the middle of the LGP is dark, which reduces quality of the backlight module.

SUMMARY

In view of the above-described problems, the aim of the present disclosure is to provide a backlight module and a liquid crystal display (LCD) device. The entire lightbar of the backlight module has uniform operating temperature, emits uniform light, and has higher optical quality.

A first technical scheme of the present disclosure is that: a backlight module comprises a light guide panel (LGP), a lightbar, and a backplane. The LGP is arranged in the backplane, and the lightbar is arranged on a side of the LGP. The backlight module further comprises heating devices that heat two opposite ends of the lightbar.

In one example, the heating devices are arranged on a back of the lightbar.

In one example, the heating devices are arranged on the backplane, and operating temperature of the two opposite ends of the lightbar is increased by increasing ambient temperature of the two opposite ends of the lightbar.

In one example, a number of the heating devices is two, and the two heating devices correspond to the two opposite ends of the lightbar.

In one example, each if heating devices is a circular resistance wire. The resistance wire has small volume, easy control of heating power, and difficult to damage.

In one example, the backlight module further comprises temperature controllers. The temperature controllers are arranged at the two opposite ends of the lightbar and are electrically connected to the heating devices.

In one example, the temperature controllers are thermostatic controllers.

In one example, the backlight module further comprises a control chip, a temperature sensor that measures the operating temperature of the two opposite ends of the lightbar, and a power adjusting device that adjusts power of the heating devices. Both the temperature sensor and the power adjusting device are electrically connected to the control chip.

In one example, the backlight module further comprises a control chip, a temperature sensor that measures the operating temperature of the two opposite ends and middle of the lightbar, and a power adjusting device that adjusts the power of the heating devices. Both the temperature sensor and the power adjusting device are electrically connected to the control chip.

The present disclosure further provides a second technical scheme: a liquid crystal display (LCD) device comprises the backlight module mentioned above.

Advantages of the present disclosure are summarized below: the backlight module of the present disclosure is configured with heating devices, and the heating devices are arranged at two opposite ends of the lightbar. When the lightbar operates, the heating devices emit heat to increase the operating temperature of the two opposite ends of the lightbar to make the operating temperature of the two opposite end of the lightbar to be close to or equal to the operating temperature of the middle of the lightbar, and to make the aging degree of the lights on the lightbar to be approximately consistent. Thus, after being used for a long time, the lightbar still emits light with uniform brightness, thereby increasing the optical quality of the backlight module.

In the prior art, because of the structural limitations, heat sink structures or heat sink devices are unable to be used to reduce the operating temperature of the middle of the lightbar to the operating temperature of the two opposite ends of the lightbar to obtain uniform operating temperature. Reverse thinking is used in the present disclosure where the heating devices increase the operating temperature of the two opposite ends of the lightbar to enable the lightbar to obtain uniform operating temperature, which solves to difficult problem of nonuniform backlight module light caused by inconsistent aging degree of the lights on the lightbar.

A third technical scheme of the present disclosure is that: a liquid crystal display (LCD) device comprises a backlight module and a printed circuit board (PCB). The backlight module comprises a light guide panel (LGP), a lightbar, and a backplane. The LGP is arranged in the backplane, the lightbar is arranged on a side of the LGP, the PCB is configured with integrated circuit (IC) and metal-oxide-semiconductor-field-effect transistor (MOSFET) which emits high heat, and the IC and the MOSFET of the PCB are arranged close to the two opposite ends of the lightbar.

In the technical scheme, the two components (IC and MOSFET) which emit highest heat of the PCB are directly arranged close to the two opposite ends of the lightbar without adding the heating device. Because the operating temperature of the IC and MOSFET when the IC and MOSFET operate in a steady-state is higher than the operating temperature of the two opposite ends of the lightbar, and is close to the operating temperature of the middle of the lightbar, the operating temperature of the two opposite ends of the lightbar can be increased, so that the uniformity of the operating temperature of the lightbar tends to be uniform.

DETAILED DESCRIPTION

Figure 1:
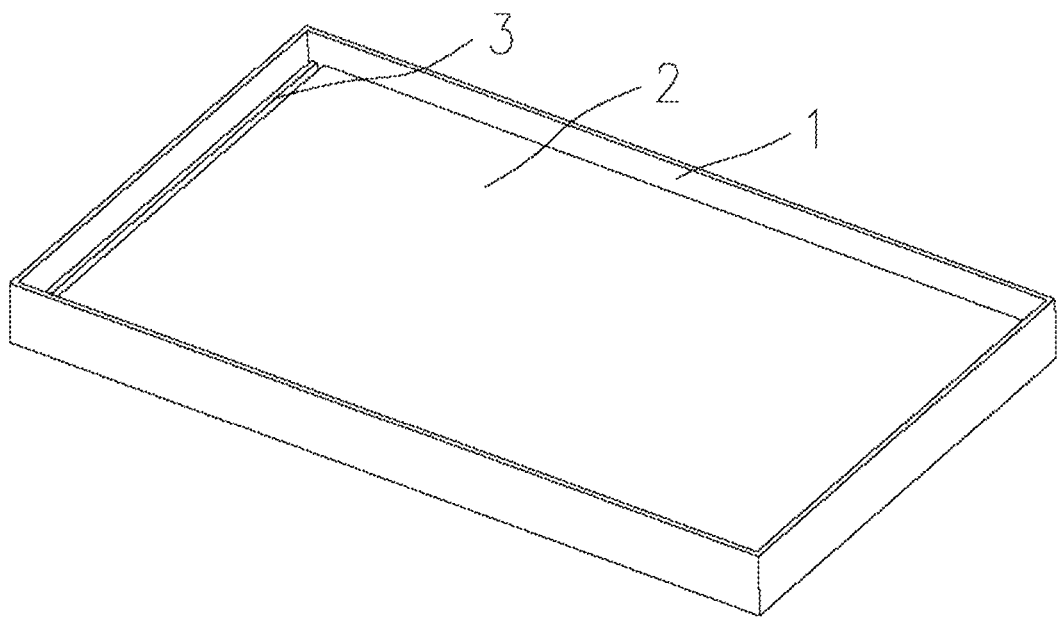
FIG. 1 is a structural diagram of a backlight module in the prior art.
Figure 2:
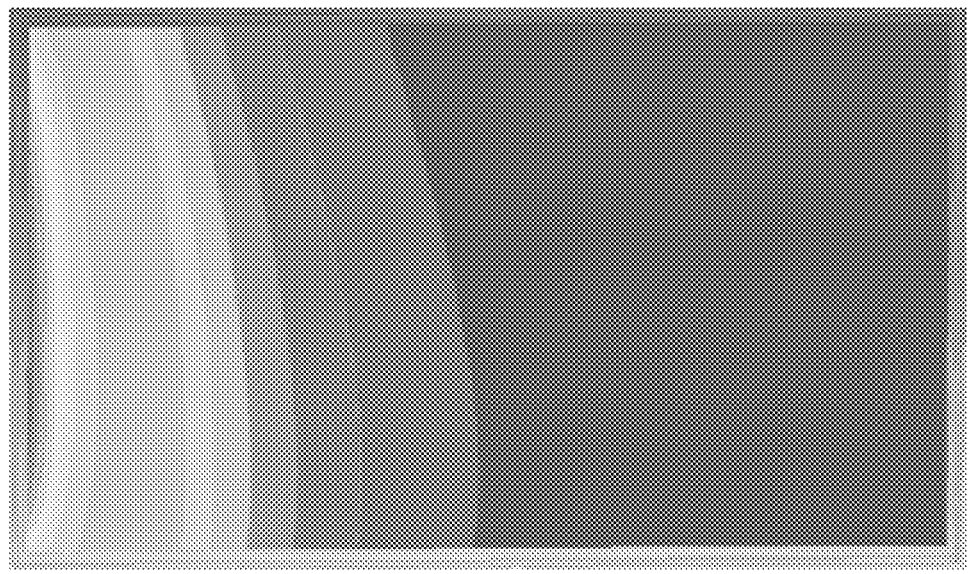
FIG. 2 is a temperature distribution diagram of a backlight module when the backlight operates in a steady-state in the prior art.
Figure 3:
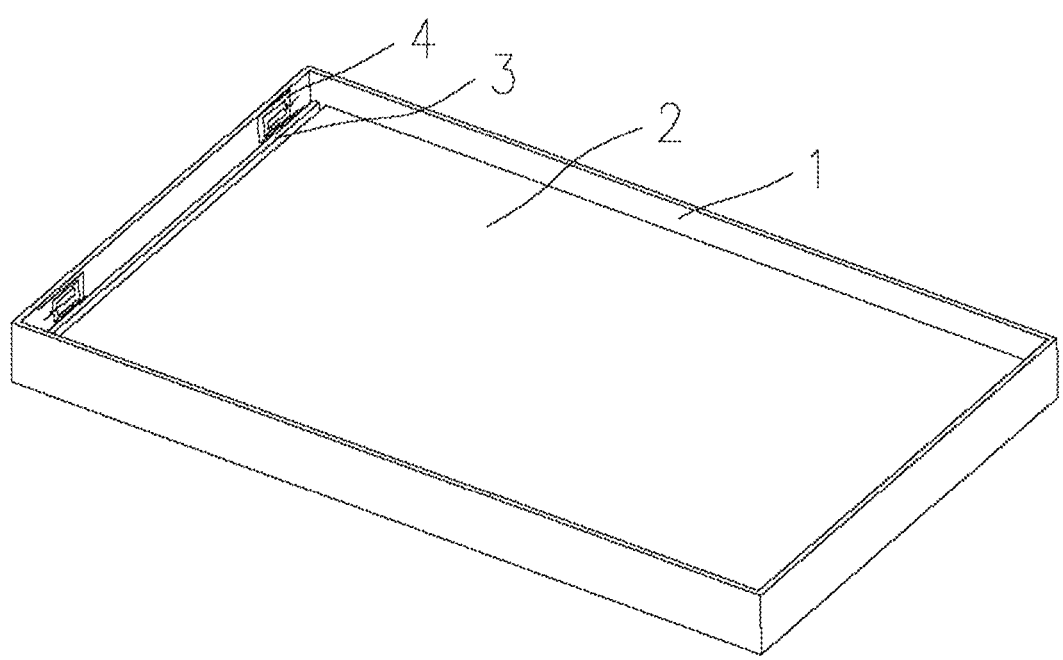
FIG. 3 is a structural diagram of a first example of a backlight module of the present disclosure.
Figure 4:
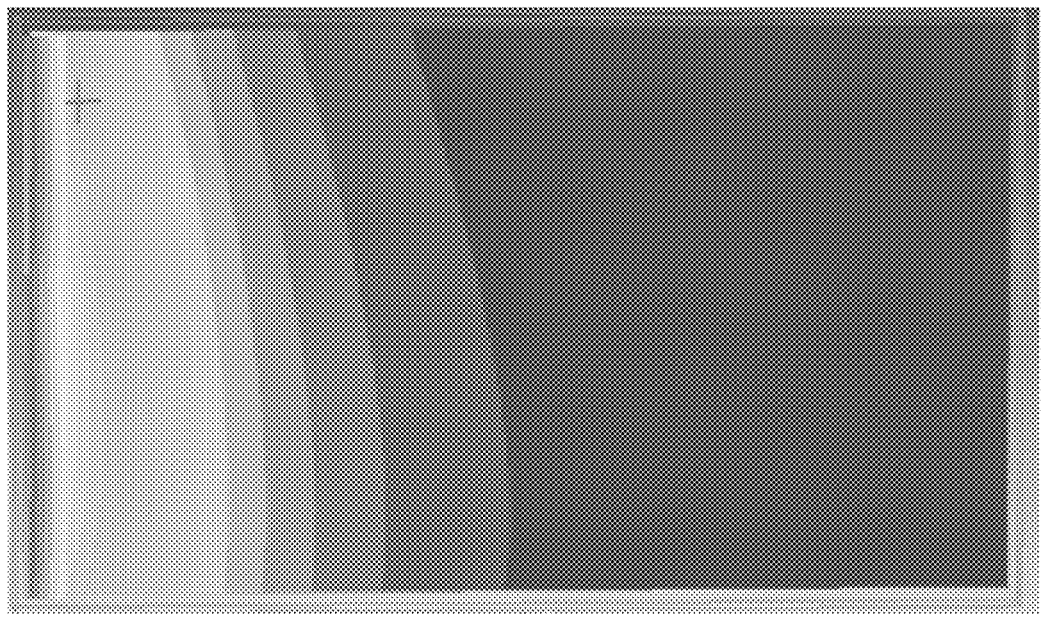
FIG. 4 is a temperature distribution diagram of a first example of a backlight module when the backlight module operates in a steady-state of the present disclosure.

The present disclosure provides a liquid crystal display (LCD) device, comprising a backlight module. FIG. 3 and FIG. 4 show a first example of the backlight module of the present disclosure. The backlight module comprises a light guide panel (LGP) 2, a lightbar 3, and a backplane 1. The LGP 2 is arranged in the backplane 1, and the lightbar 3 is arranged on a side of the LGP 2. The backlight module further comprises heating devices 4 that heat two opposite ends of the lightbar.

In the example, heating devices 4 are arranged on the backplane 1, the number of the heating devices 4 is two, and the two heating devices 4 correspond to the two opposite ends of the lightbar 3. Operating temperature of the two opposite ends of the lightbar 3 is increased by increasing ambient temperature of the two opposite ends of the lightbar 3. Each of the heating devices 4 is a circular resistance wire. The resistance wire has small volume, easy control of heating power, and is difficult to damage.

The backlight module of the present disclosure comprises the heating devices 4, and the heating devices 4 correspond to two opposite ends of the lightbar 3. When the lightbar 3 operates, the heating devices 4 emit heat to increase the operating temperature of the two opposite ends of the lightbar 3. As shown in FIG. 4, the lightbar 3 is positioned on a left side of the backlight module to make the operating temperature of the two opposite ends of the lightbar 3 to be close to or equal to operating temperature of the middle of the lightbar 3, and to make the aging degree of the lights on the lightbar 3 to be approximately consistent. Thus, after being used for a long time, the lightbar 3 can still emit light with uniform brightness, thereby increasing optical quality of the backlight module.

In the prior art, because of structural limitations, heat sink structures or heat sink devices are unable to be used to reduce the operating temperature of the middle of the lightbar to the operating temperature of the two opposite ends of the lightbar to obtain uniform operating temperature. Reverse thinking is used in the present disclosure where the heating devices increase the operating temperature of the two opposite ends of the lightbar to enable the lightbar to obtain uniform operating temperature, which solves a difficult problem of nonuniform backlight module light caused by inconsistent aging degree of the lights on the lightbar.

Figure 5:
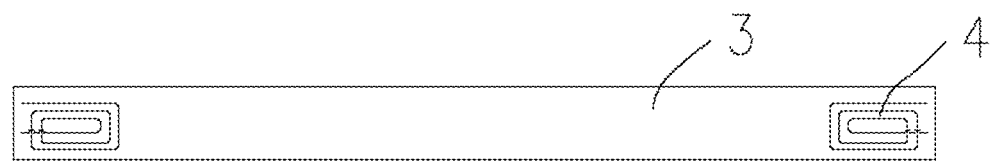
FIG. 5 is a back view of a second example of a backlight module of the present disclosure.

FIG. 5 shows a second example of the backlight module of the present disclosure, and the second example is different with the first example in that: the heating devices 4 are arranged on back of the lightbar 3 to directly heat the two opposite ends of the lightbar 3. The rest of the structures and advantages are the same as the first example; thus, the example does not give unnecessary details.

As another example of the backlight module of the present disclosure, the backlight module is further configured with temperature controllers. The temperature controllers are arranged at the two opposite ends of the lightbar and are electrically connected to the heating devices. In general, operating temperature of the middle of the lightbar when the lightbar operates in a steady-state is obtained by experiments in accordance with experience, and then the appropriate temperature controller sets a temperature. When operating temperature of the two opposite ends of the lightbar is lower than the set temperature, the temperature controller is turned on to make the heating devices to operate; when the operating temperature of the two opposite ends of the lightbar is higher than the set temperature, the temperature controller is turned of to make the heating devices to stop operating. Thus, the operating temperature of the two opposite ends of the lightbar is kept within a determined temperature range. The narrower the temperature range is, the better the effect is; the closer the temperature range is to the operating temperature of the middle of the lightbar is, the better the effect is. If the temperature controllers are thermostatic controllers, consistency of the operating temperature of the entire lightbar is improved.

As another example of the backlight module of the present disclosure, the backlight module comprises a control chip, a temperature sensor that measures operating temperature of the two opposite ends of the lightbar, and a power adjusting device that adjusts power of the heating devices. Both the temperature sensor and the power adjusting device are electrically connected to the control chip. The operating temperature of the lightbar varies within a narrow range when the lightbar operates in a steady-state. In the example, the operating temperature of the two opposite ends of the lightbar is measured by the temperature sensor, and the measured operating temperature is compared with empirical temperature data when the middle of the lightbar is in steady-state. If the measured operating temperature of the two opposite ends of the lightbar is less than the empirical temperature data when the middle of the lightbar is in a steady-state, the power adjusting device increases power of the heating devices to increase heat productivity, so as to increase the operating temperature of the two opposite ends of the lightbar. When the measured operating temperature of the two opposite ends of the lightbar is more than the empirical temperature data when the middle of the lightbar is in a steady-state, the power adjusting device reduces the power of the heating devices to reduce heat productivity, so as to reduce the operating temperature of the two opposite ends of the lightbar. Thus, the operating temperature of the two opposite ends of the lightbar tends to be coincident with the operating temperature of the middle of the lightbar. Therefore, the aging degree of the lights on the lightbar is approximately consistent, thereby increasing optical quality of the backlight module.

As another example of the backlight module of the present disclosure, the backlight module comprise a control chip, a temperature sensor that measures the operating temperature of the two opposite ends and the middle of the lightbar, and a power adjusting device that adjusts the power of the heating devices. Both the temperature sensor and the power adjusting device are electrically connected to the control chip. The example is difference with the above example in that: the operating temperature of the two opposite ends and the middle of the lightbar is measured by the temperature sensor, the operating temperature of the two opposite ends of the lightbar is directly compared with the operating temperature of the middle of the lightbar, and the control chip controls the power adjusting device to increase or reduce heating power in accordance with compared result. Because the operating temperature data is directly measured by the temperature sensor, the result is more accurate to improve the consistency of all the temperature of the lightbar to a maximum extent.

As another example of the LCD device of the present disclosure, the LCD device comprises a backlight module and a printed circuit board (PCB). The backlight module comprises a light guide panel (LGP), a lightbar, and a backplane. The LGP is arranged in the backplane, the lightbar is arranged on a side of the LGP, the PCB is configured with integrated circuit (IC) and a metal-oxide-semiconductor-field-effect transistor (MOSFET) which emits high heat, and the IC and MOSFET on the PCB are arranged close to the two opposite ends of the lightbar.

In the technical scheme, the two components (IC and MOSFET) which emit highest heat of the PCB are directly arranged close to the two opposite ends of the lightbar without adding the heating device. Because the operating temperature of the IC and MOSFET, when the IC and MOSFET operate in a steady-state, is higher than the operating temperature of the two opposite ends of the lightbar, and is close to the operating temperature of the middle of the lightbar, the operating temperature of the two opposite ends of the lightbar is increased, so that uniformity of the operating temperature of the entire lightbar tends to be consistent.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

The invention claimed is:

1. A backlight module, comprising:
a backplane;
a light guide panel (LGP) arranged in the backplane;
a lightbar arranged on a side of the LGP; and
heating devices arranged on an external side of the two opposite ends of the lightbar, and the heating devices heat two opposite ends of the lightbar to increase an operating temperature of the two opposite ends of the lightbar to make the operating temperature of the two opposite end of the lightbar to be close to or equal to an operating temperature of a middle portion of the lightbar.

2. The backlight module of claim 1, wherein the heating devices are arranged on a back of the lightbar or arranged on the backplane.

3. The backlight module of claim 1, wherein the number of the heating devices is two, and the two heating devices correspond to the two opposite ends of the lightbar.

4. The backlight module of claim 1, wherein each of the heating devices is a circular resistance wire.

5. A liquid crystal display (LCD) device, comprising:
a backlight module comprising a light guide panel (LGP), a lightbar, a backplane, and heating devices; wherein the LGP is arranged in the backplane, the lightbar is arranged on a side of the LGP, the heating devices are arranged on an external side of the two opposite ends of the lightbar, and the heating devices heat two opposite ends of the lightbar to increase an operating temperature of the two opposite ends of the lightbar to make the operating temperature of the two opposite end of the lightbar to be close to or equal to an operating temperature of a middle portion of the lightbar.

6. The liquid crystal display (LCD) device of claim 5, wherein the heating devices are arranged on a back of the lightbar or arranged on the backplane.

7. The liquid crystal display (LCD) device of claim 5, wherein a number of the heating devices is two, and the two heating devices correspond to the two opposite ends of the lightbar.

8. The liquid crystal display (LCD) device of claim 5, wherein each of the heating devices is a circular resistance wire.

9. A liquid crystal display (LCD) device, comprising:
a backlight module; and
a printed circuit board (PCB), wherein the backlight module comprises a light guide panel (LGP), a lightbar, and a backplane; the LGP is arranged in the backplane, the lightbar is arranged on a side of the LGP, the PCB is configured with a high heating integrated circuit (IC) and a metal-oxide-semiconductor-field-effect transistor (MOSFET), and the IC and MOSFET of the PCB are arranged close to an external side of the two opposite ends of the lightbar, the IC and MOSFET heat the two opposite ends of the lightbar to increase an operating temperature of the two opposite ends of the lightbar to make the operating temperature of the two opposite end of the lightbar to be close to or equal to an operating temperature of a middle portion of the lightbar.

* * * * *